(12) United States Patent
Tan et al.

(10) Patent No.: US 7,936,571 B2
(45) Date of Patent: May 3, 2011

(54) PROTECTION CIRCUIT MODULE FOR SECONDARY BATTERY

(75) Inventors: Kunihiro Tan, Sanda (JP); Masahiro Higashiguchi, Kobe (JP)

(73) Assignee: Ricoh Company, Ltd., Tokyo (JP)

( * ) Notice: Subject to any disclaimer, the term of this patent is extended or adjusted under 35 U.S.C. 154(b) by 293 days.

(21) Appl. No.: 12/243,113

(22) Filed: Oct. 1, 2008

(65) Prior Publication Data

US 2009/0086397 A1    Apr. 2, 2009

(30) Foreign Application Priority Data

Oct. 1, 2007   (JP) .................. 2007-257153

(51) Int. Cl.
*H05K 7/02* (2006.01)
*H05K 7/04* (2006.01)
*H05K 7/10* (2006.01)

(52) U.S. Cl. ...................... 361/807; 361/810
(58) Field of Classification Search .......... 361/760, 361/777, 767, 720, 736, 748, 803, 807, 810
See application file for complete search history.

(56) References Cited

U.S. PATENT DOCUMENTS 6,163,461 A * 12/2000 Watanabe ............. 361/760
6,654,218 B1 * 11/2003 Yokoyama et al. ....... 361/78

FOREIGN PATENT DOCUMENTS

| JP | 11-26029 | 1/1999 |
|----|----------|--------|
| JP | 2000-307052 | 11/2000 |
| JP | 2006-121827 | 5/2006 |
| JP | 3806695 | 5/2006 |
| JP | 2006-186298 | 7/2006 |
| JP | 2006-187185 | 7/2006 |
| JP | 2007-33215 | 2/2007 |

* cited by examiner

*Primary Examiner* — Hung S Bui
(74) *Attorney, Agent, or Firm* — Cooper & Dunham LLP

(57) ABSTRACT

A protection circuit module for a secondary battery including a wiring substrate including two battery-side external connection terminals provided on a top surface thereof, multiple load-side external connection terminals provided on a back surface opposite the top surface, and at least one cutout or through-hole in the wiring substrate; one or more electronic components provided on the wiring substrate; and two metal plates provided respectively on the two battery-side external connection terminals. The at least one cutout or through-hole is provided at a portion of the wiring substrate in which one of the two metal plates is provided, so that a part of the one of the two metal plates is exposed through the cutout or the through-hole when viewed from the back surface of the wiring substrate.

15 Claims, 8 Drawing Sheets

PROTECTION CIRCUIT MODULE FOR SECONDARY BATTERY

BACKGROUND

1. Technical Field

This disclosure relates to a protection circuit module for a secondary battery.

2. Description of the Background

With increasing use of rechargeable secondary batteries in a variety of portable data devices in recent years, there is increasing demand for prevention of deterioration, a longer power supply time, miniaturization, and cost reduction for those secondary batteries.

Accordingly, a typical battery pack, such as a commonly used lithium-ion battery pack, often includes a protection circuit module including a protection circuit for preventing deterioration of the battery because of overheating caused by excessive current generated by a short circuit, overcharging (that is, over-voltage or reverse voltage), or the like.

The protection circuit module for the secondary battery includes a wiring substrate provided with electronic components. Two battery-side external connection terminals, configured to connect the electronic components to the secondary battery, and multiple load-side external connection terminals are provided on the wiring substrate. Metal plates are provided respectively on the two battery-side external connection terminals through a solder joint. The protection circuit module and the secondary battery are connected to each other through belt-shaped metal leads. Specifically, an edge of each of the metal leads is welded to each of the metal plates provided on the protection circuit module, and the other edge of each of the metal leads is connected to each of electrodes of the secondary battery.

FIG. 1 is a side view illustrating a battery pack including a related-art protection circuit module.

Referring to FIG. 1, a protection circuit module 103, a secondary battery 105, and metal leads 107a and 107b are disposed within an insulating housing 101. Metal plates 109a and 109b are provided respectively on two battery-side external connection terminals of the protection circuit module 103 through a solder joint.

The protection circuit module 103 is arranged within the housing 101 such that a back surface on which load-side external connection terminals and a test terminal are provided faces outward, and a top surface on which the metal plates 109a and 109b and a sealing resin 111' are provided faces inward.

The metal plate 109a of the protection circuit module 103 is connected to an electrode 105a of the secondary battery 105 through the metal lead 107a which is spot-welded to the metal plate 109a. The metal lead 107a and the electrode 105a are also spot-welded to each other.

The metal plate 109b of the protection circuit module 103 is connected to an electrode 105b of the secondary battery 105 through the metal lead 107b which is spot-welded to the metal plate 109b. The metal lead 107b and the electrode 105b are also spot-welded to each other.

With such a configuration, however, space is required to route the two metal leads used to connect the secondary battery to the two metal plates provided respectively on the two battery-side external connection terminals of the protection circuit module, making it difficult to make the related-art protection circuit module, and thus the secondary battery pack itself, more compact.

SUMMARY

In an aspect of this disclosure, a protection circuit module for a secondary battery is configured to reduce or eliminate a space for routing metal leads for connecting battery-side external connection terminals of the protection circuit module to the secondary battery in a battery pack.

In an exemplary embodiment, a protection circuit module for a secondary battery including a wiring substrate including two battery-side external connection terminals provided on a top surface thereof, multiple load-side external connection terminals provided on a back surface opposite the top surface, and at least one cutout or through-hole in the wiring substrate; one or more electronic components provided on the wiring substrate; and two metal plates provided respectively on the two battery-side external connection terminals. The at least one cutout or through-hole is provided at a portion of the wiring substrate in which one of the two metal plates is provided, so that a part of the one of the two metal plates is exposed through the cutout or the through-hole when viewed from the back surface of the wiring substrate.

The aforementioned and other aspects, features and advantages will be more fully apparent from the following detailed description of exemplary embodiments, the accompanying drawings, and the associated claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein like reference numerals designate identical or corresponding parts throughout the several views and wherein.

DETAILED DESCRIPTION OF THE EXEMPLARY EMBODIMENTS

Figure 1:
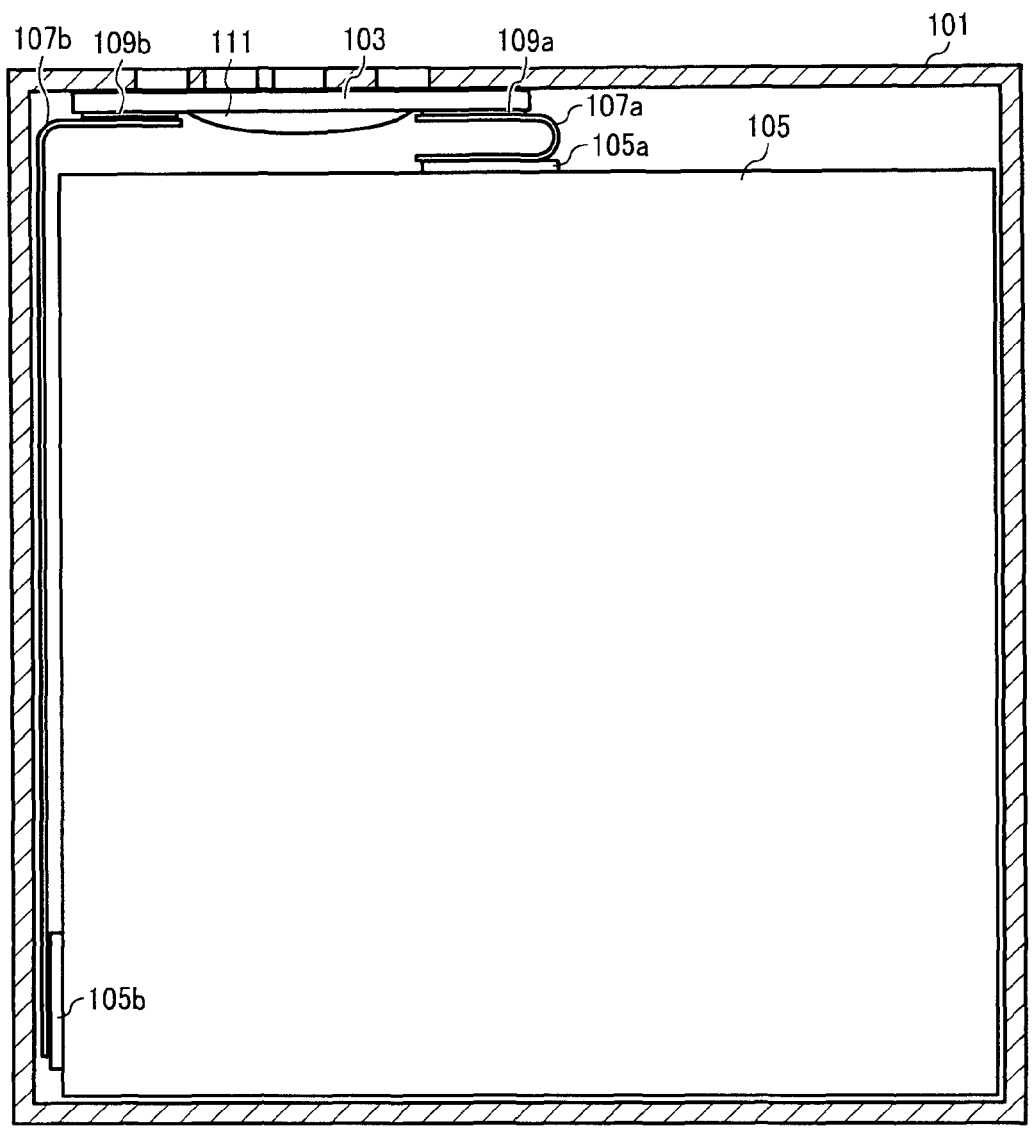
FIG. 1 is a side view illustrating a battery pack including a related-art protection circuit module.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Figure 2A:
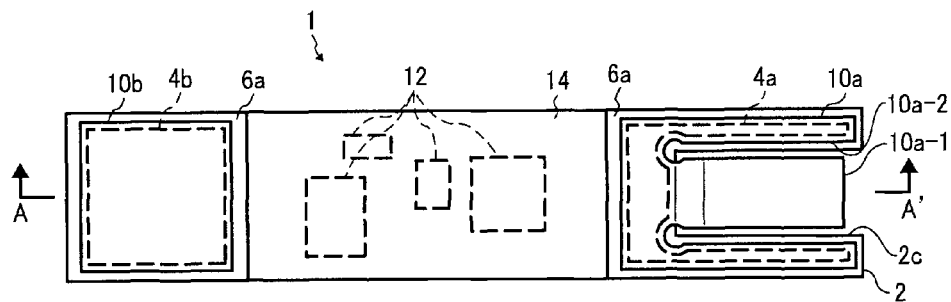
FIGS. 2A, 2B, and 2C are plan, side, and bottom views, respectively, of an example of a configuration of a protection circuit module.
Figure 2B:
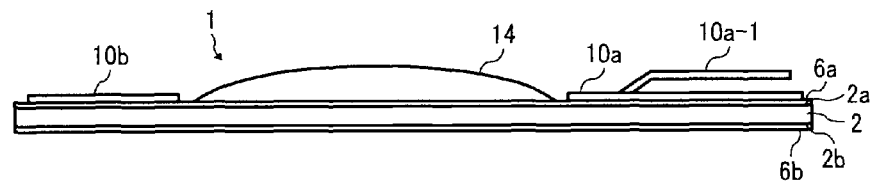
Figure 2C:
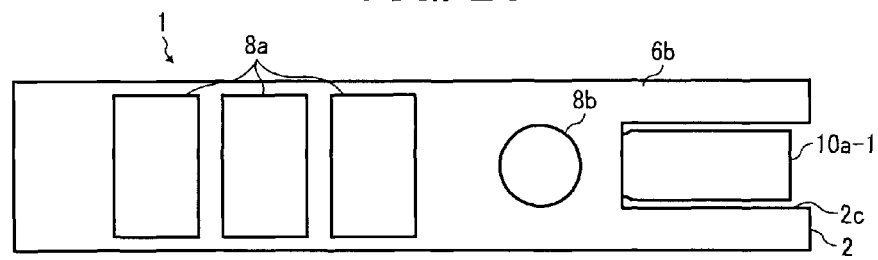
Figure 2D:
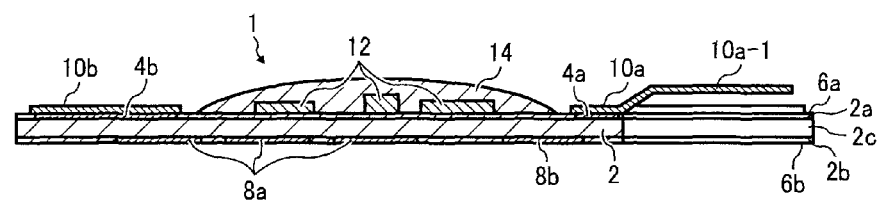
FIG. 2D is a vertical cross-sectional view illustrating the configuration of the protection circuit module along a line A-A' in FIG. 2A.

FIGS. 2A, 2B, and 2C are plan, side, and bottom views, respectively, of a configuration of a protection circuit module according to a first exemplary embodiment. FIG. 2D is a vertical cross-sectional view illustrating the configuration of the protection circuit module along a line A-A' in FIG. 2A.

Referring to FIGS. 2A to 2D, a protection circuit module 1 includes a wiring substrate 2. Two battery-side external connection terminals 4a and 4b, an electrode for multiple electronic components, not shown, and a wiring pattern, not shown, are provided on a top surface 2a of the wiring substrate 2. The two battery-side external connection terminals 4a and 4b, the electrode for the multiple electronic components, and the wiring pattern are made of, for example, copper. The electrode for the multiple electronic components is provided between the two battery-side external connection terminals 4a and 4b.

The wiring substrate 2 includes a cutout 2c. The battery-side external connection terminal 4a is U-shaped so that the cutout 2c is surrounded by the battery-side external connection terminal 4a.

An insulating layer 6a is formed on the top surface 2a of the wiring substrate 2. The insulating layer 6a includes openings on the battery-side external connection terminals 4a and 4b and the electrode for the multiple components, respectively.

Three load-side external connection terminals 8a and a test terminal 8b are provided on a back surface 2b of the wiring substrate 2, which is opposite the top surface 2a. The load-side external connection terminals 8a and the test terminal 8b are made of, for example, copper.

In the protection circuit module 1 according to the first exemplary embodiment, the number of the load-side external connection terminals 8a and the test terminal 8b may be arbitrarily set. Alternatively, the test terminal 8b may be eliminated.

An insulating layer 6b is provided on the back surface 2b of the wiring substrate 2. The insulating layer 6b includes openings on the load-side external connection terminals 8a and the test terminal 8b, respectively. A gold plating layer, not shown, is formed on surfaces of each of the load-side external connection terminals 8a and the test terminal 8b.

On the top surface 2a of the wiring substrate 2, a metal plate 10a is provided on the battery-side external connection terminal 4a through a solder joint, not shown, and a metal plate 10b is provided on the battery-side external connection terminal 4b through a solder joint, not shown. The metal plates 10a and 10b are made of, for example, nickel.

A part of the metal plate 10a is exposed through the cutout 2c when viewed from the back surface 2b of the wiring substrate 2. The metal plate 10a includes a slit 10a-2 such that the above-described exposed part of the metal plate 10a serves as a free edge 10a-1 movable relative to the wiring substrate 2. A base edge of the free edge 10a-1 is bent so that there is a space between a leading edge of the free edge 10a-1 and the wiring substrate 2 when viewed from the lateral side of the protection circuit module 1.

Further, on the top surface 2a of the wiring substrate 2, electronic components 12 are provided on the electrode for the electronic components provided between the battery-side external connection terminals 4a and 4b. Specific examples of the electronic components 12 include an IC chip, a field-effect transistor, a thermistor such as a PTC element, a resistor, and a condenser. The type and the number of the electronic components 12 included in the protection circuit module 1 are not limited.

A sealing resin 14 is formed on the insulating layer 6a between the metal plates 10a and 10b, on which the electronic components 12 are provided. Accordingly, the electronic components 12 are covered and protected by the sealing resin 14.

Figure 3A:
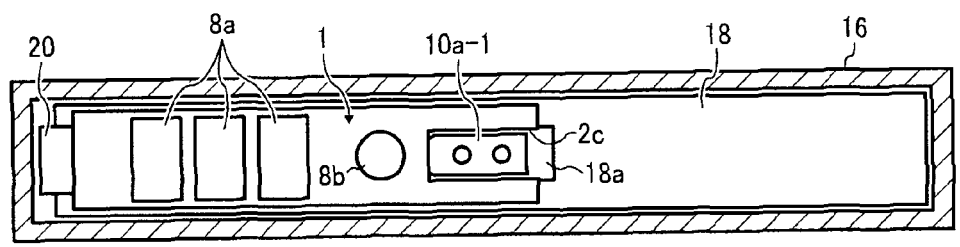
FIGS. 3A and 3B are top and side views, respectively, of an example of a configuration of a battery pack including the protection circuit module illustrated in FIGS. 2A to 2D.
Figure 3B:
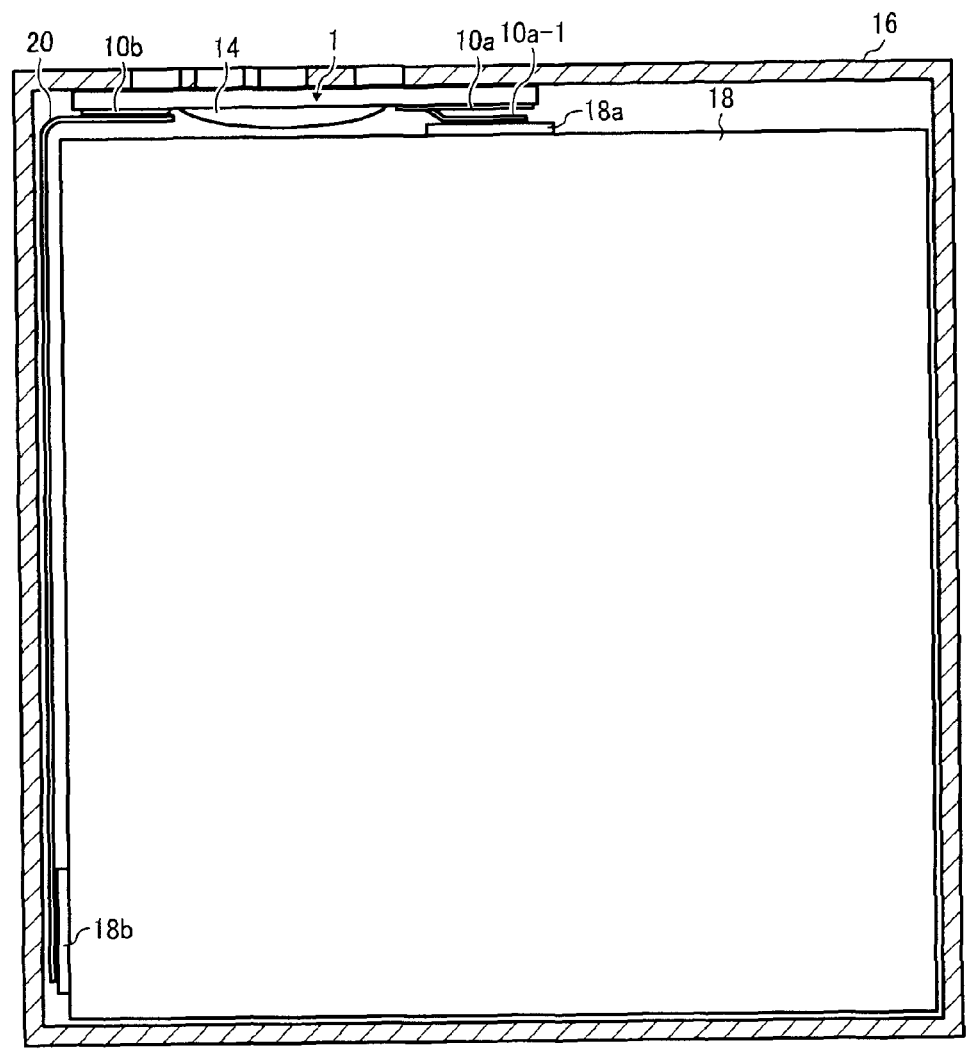

FIGS. 3A and 3B are plan and side views, respectively, of an example, of a configuration of a battery pack including the protection circuit module 1 according to the first exemplary embodiment described above.

Referring to FIGS. 3A and 3B, the protection circuit module 1, a secondary battery 18, and a metal lead 20 are disposed within a housing 16 made of an insulating member. The metal lead 20 is made of, for example, nickel.

The protection circuit module 1 is arranged within the housing 16 such that the back surface 2b on which the load-side external connection terminals 8a and the test terminal 8b are provided faces outward and the top surface 2a on which the metal plates 10a and 10b and the sealing resin 14 are provided faces inward. The housing 16 includes openings corresponding to the load-side external connection terminals 8a and the test terminal 8b.

The metal plate 10a of the protection circuit module 1 is connected to an electrode 18a of the secondary battery 18 by spot-welding the free-edge 10a-1 of the metal plate 10a to the electrode 18a. The free-edge 10a-1 is spot-welded to the electrode 18a through the cutout 2c of the wiring substrate 2.

The metal plate 10b is connected to an electrode 18b of the secondary battery 18 through the metal lead 20 which is spot-welded to the metal plate 10b. The metal lead 20 is also spot-welded to the electrode 18b.

As described above, the wiring substrate 2 of the protection circuit module 1 includes the cutout 2c at a portion in which the metal plate 10a is provided. The free edge 10a-1 of the metal plate 10a is exposed through the cutout 2c when viewed from the back surface 2b of the wiring substrate 2. Accordingly, the metal plate 10a of the protection circuit module 1 is directly welded to the electrode 18a of the secondary battery 18. As a result, because the above-described configuration makes it possible to eliminate a metal lead for connecting the metal plate 10a to the electrode 18a, a space required to route metal leads for connecting the battery-side external connection terminals 4a and 4b of the protection circuit module 1 to the secondary battery 18 can be reduced within the housing 16 of the battery pack compared to a case in which two metal leads are provided to connect the battery-side external connection terminals 4a and 4b to the secondary battery 18. When the space for the metal leads is reduced, a size of the battery pack can also be reduced. In addition, the capacitance of the secondary battery can be increased in the battery pack requiring less space for the metal lead.

Further, as described above, in the protection circuit module 1 according to the first exemplary embodiment, the metal plate 10a includes the slit 10a-2 such that a part of the metal plate 10a exposed through the cutout 2c when viewed from the back surface 2b of the wiring substrate 2 serves as the free edge 10a-1 movable relative to the wiring substrate 2. The base edge of the free edge 10a-1 is bent so that there is a space between the leading edge of the free edge 10a-1 and the wiring substrate 2 when viewed from the lateral side of the protection circuit module 1. As a result, stress between the protection circuit module 1 and the electrode 18a of the secondary battery 18 can be absorbed by providing elasticity to the base edge of the free edge 10a-1.

As illustrated in FIGS. 2A to 2D, the wiring substrate 2 of the protection circuit module 1 according to the first exemplary embodiment includes the cutout 2c to expose the free edge 10a-1 of the metal plate 10a on the back surface 2b. Alternatively, the wiring substrate 2 may include a through-hole to expose the free edge 10a-1 of the metal plate 10a on the back surface 2b.

Figure 4A:
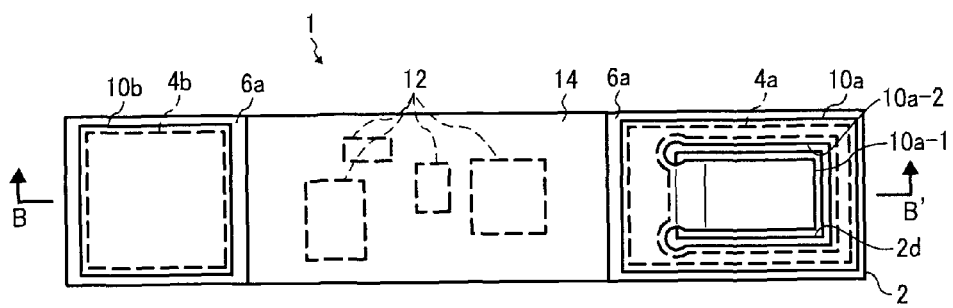
FIGS. 4A, 4B, and 4C are plan, side, and bottom views, respectively, of another example of the configuration of the protection circuit module.
Figure 4B:
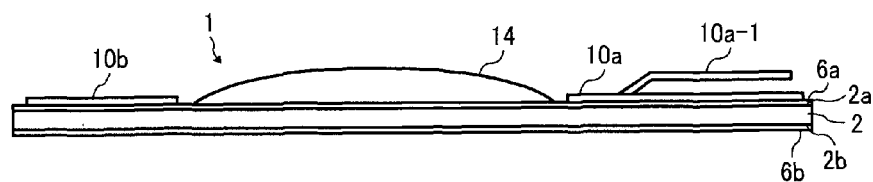
Figure 4C:
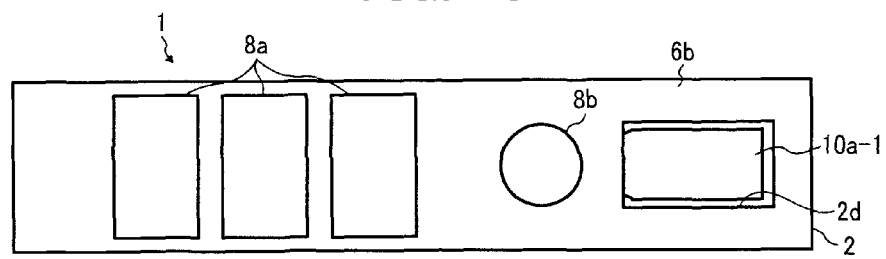
Figure 4D:
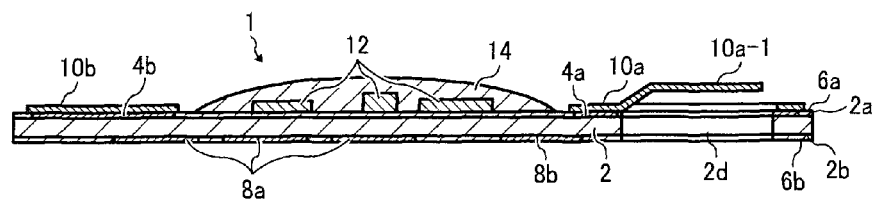
FIG. 4D is a vertical cross-sectional view illustrating the configuration of the protection circuit module along a line B-B' in FIG. 4A.

FIGS. 4A, 4B, and 4C are plan, side, and bottom views, respectively, of a configuration of the protection circuit module 1 according to a second exemplary embodiment. FIG. 4D is a vertical cross-sectional view illustrating the configuration of the protection circuit module 1 along a line B-B' in FIG. 4A.

In the protection circuit module 2 according to the second exemplary embodiment, a through-hole 2d is provided in place of the cutout 2c. The battery-side external connection terminal 4a is formed in a frame-like shape to surround the through-hole 2d.

The metal plate 10a is provided on the battery-side external connection terminal 4a through a solder joint, not shown. The slit 10a-2 has a U-shape when viewed from above. The free edge 10a-1 of the metal plate 10a is exposed through the through-hole 2d when viewed from the back surface 2b of the wiring substrate 2.

According to the second exemplary embodiment, the protection circuit module 1 includes the through-hole 2d at a portion in which the metal plate 10a is provided on the wiring substrate 2. The free edge 10a-1 of the metal plate 10a is exposed through the through-hole 2d when viewed from the back surface 2b of the wiring substrate 2. As a result, in the same manner as the configuration according to the first exemplary embodiment, the metal plate 10a of the protection circuit module 1 is directly welded to the electrode 18a of the secondary battery 18, thereby achieving the same effect as that obtained by the configuration according to the first exemplary embodiment.

Further, in the same manner as the configuration according to the first exemplary embodiment, stress between the protection circuit module 1 and the electrode 18a of the secondary battery 18 can be absorbed by providing elasticity to the base edge of the free edge 10a-1.

In the protection circuit module 1 according to the second exemplary embodiment, the metal plate 10a may include the slit 10a-2 as illustrated in FIGS. 2A to 2D.

Figure 5A:
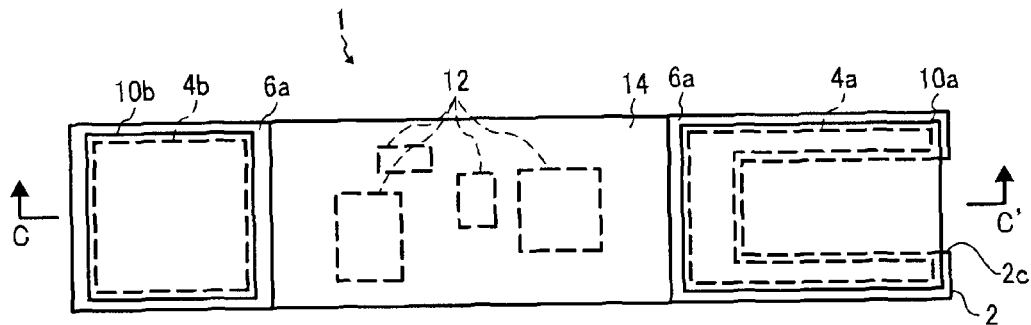
FIGS. 5A, 5B, and 5C are plan, side, and bottom views, respectively, of yet another example of the configuration of the protection circuit module.
Figure 5B:
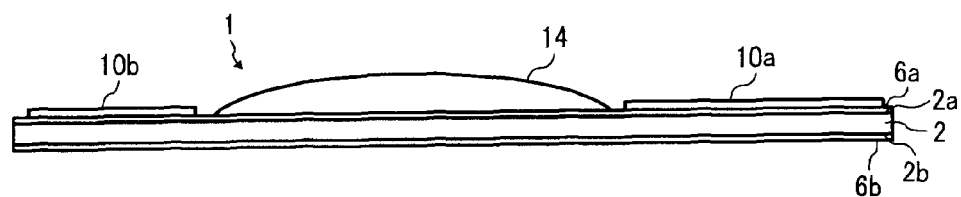
Figure 5C:
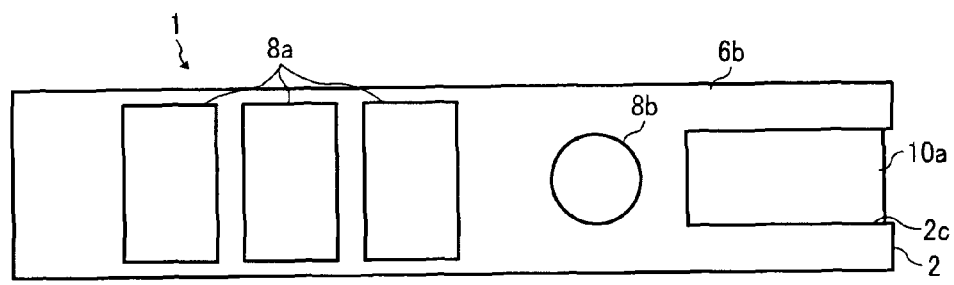
Figure 5D:
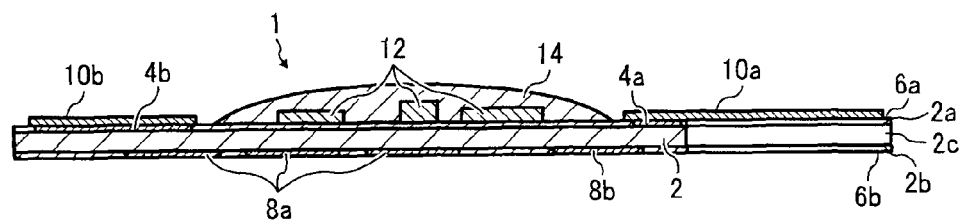
FIG. 5D is a vertical cross-sectional view illustrating the configuration of the protection circuit module along a line C-C' in FIG. 5A.

FIGS. 5A, 5B, and 5C are plan, side, and bottom views, respectively, of a configuration of the protection circuit module 1 according to a third exemplary embodiment. FIG. 5D is a vertical cross-sectional view illustrating the configuration of the protection circuit module 1 along a line C-C' in FIG. 5A.

According to the third exemplary embodiment, the metal plate 10a provided on the cutout 2c has a flat plate-like shape.

As illustrated in FIGS. 5A to 5D, the metal plate 10a need not necessarily include the free edge 10a-1 and the slit 10a-2.

Figure 6A:
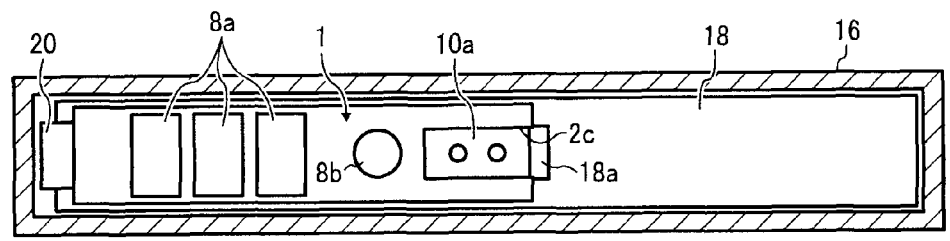
FIGS. 6A and 6B are top and side views, respectively, of an example of a configuration of a battery pack including the protection circuit module illustrated in FIGS. 5A to 5D.
Figure 6B:
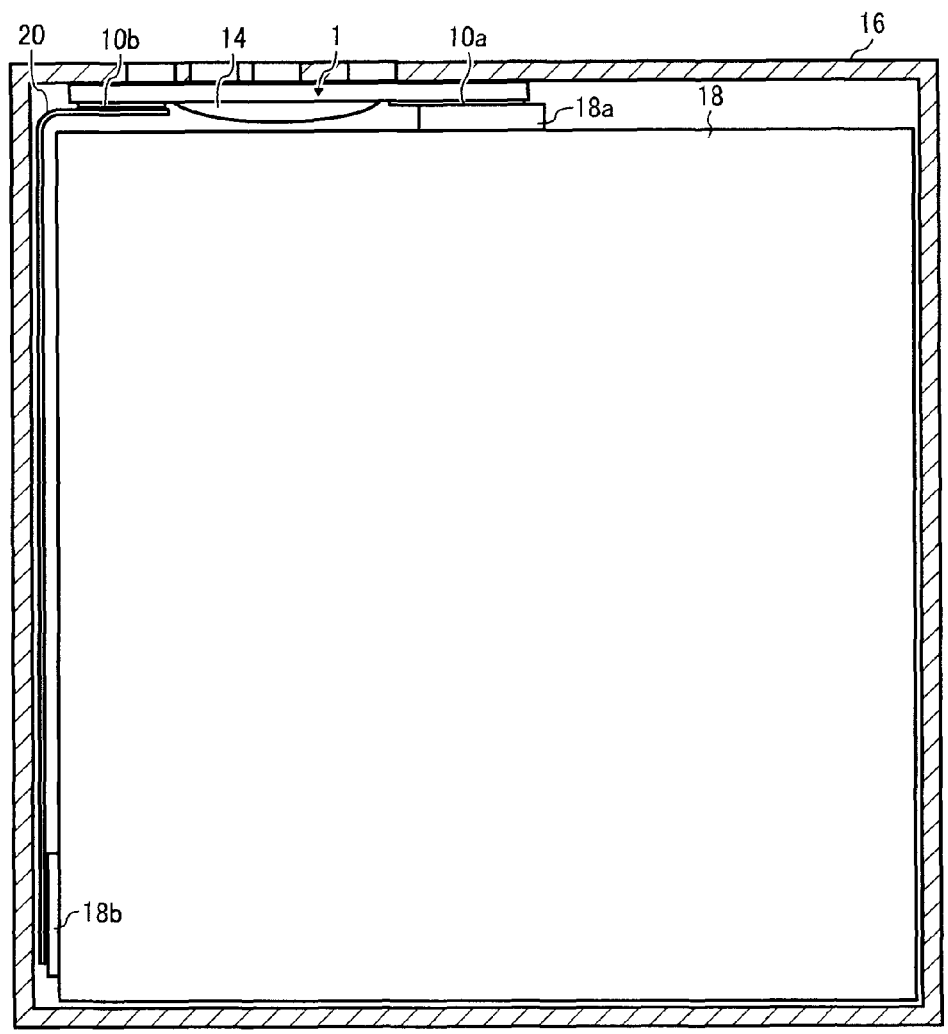

FIGS. 6A and 6B are plan and side views, respectively, of a configuration of a battery pack including the protection circuit module 1 according to the third exemplary embodiment. In FIGS. 6A and 6B, the same reference numerals are assigned to those components that are the same as those illustrated in FIGS. 3A and 3B.

The metal plate 10a of the protection circuit module 1 is connected to the electrode 18a of the secondary battery 18 by spot-welding a part of the metal plate 10a exposed through the cutout 2c to the electrode 18a. Specifically, the metal plate 10a is spot-welded to the electrode 18a through the cutout 2c of the wiring substrate 2.

Also in the protection circuit module 1 according to the third exemplary embodiment, the wiring substrate 2 includes the cutout 2c at a portion in which the metal plate 10a is provided so that a part of the metal plate 10a is exposed through the cutout 2c when viewed from the back surface 2b of the wiring substrate 2. Accordingly, in the same manner as the configuration according to the first exemplary embodiment, the metal plate 10a of the protection circuit module 1 is directly welded to the electrode 18a of the secondary battery 18. As a result, a space required to route the metal leads in the housing 16 of the battery pack can be reduced, and the size of the battery pack can also be reduced. Further, the capacitance of the secondary battery can be increased in the battery pack requiring less space for the metal lead.

As described above, in the protection circuit module 1 according to the third exemplary embodiment, the wiring substrate 2 includes the cutout 2c to expose the part of the metal plate 10a on the back surface 2b. Alternatively, the wiring substrate 2 may include a through-hole to expose the part of the metal plate 10a on the back surface 2b.

Figure 7A:
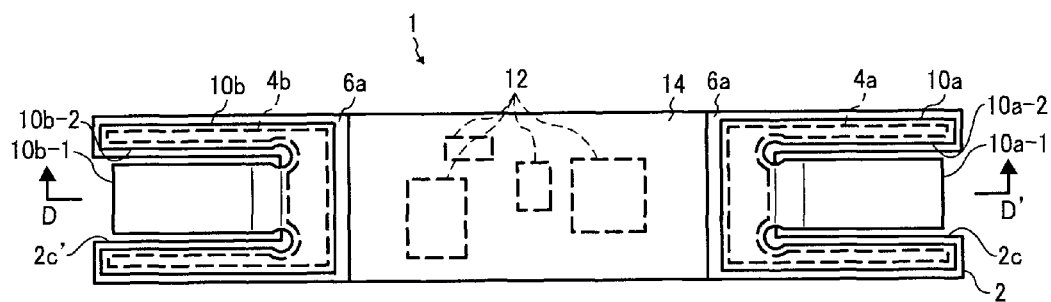
FIGS. 7A, 7B, and 7C are plan, side, and bottom views, respectively, of yet another example of the configuration of the protection circuit module.
Figure 7B:
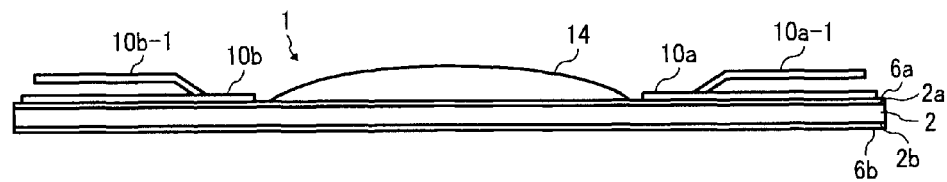
Figure 7C:
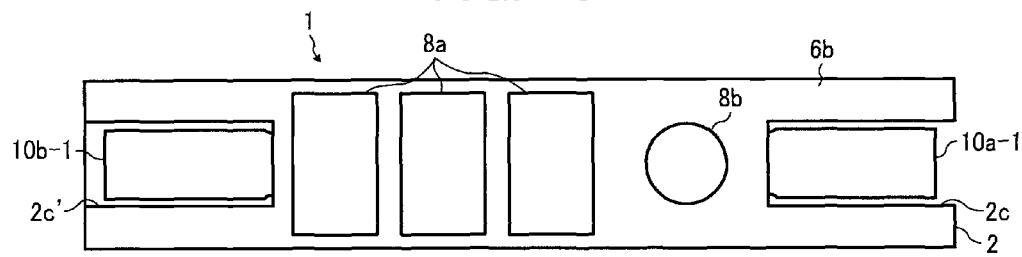
Figure 7D:
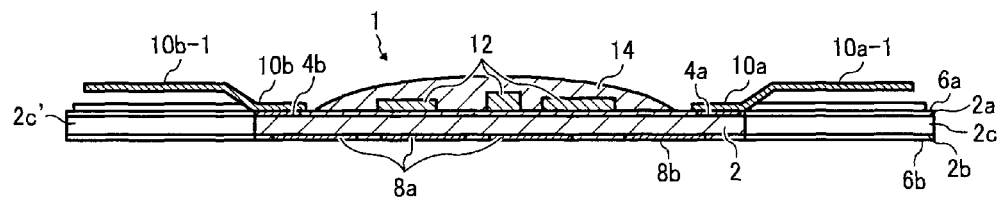
FIG. 7D is a vertical cross-sectional view illustrating the configuration of the protection circuit module along a line D-D' in FIG. 7A.

FIGS. 7A, 7B, and 7C are plan, side, and bottom views, respectively, of a configuration of the protection circuit module 1 according to a fourth exemplary embodiment. FIG. 7D is a vertical cross-sectional view illustrating the configuration of the protection circuit module 1 along a line D-D' in FIG. 7A.

In the protection circuit module 1 according to the fourth exemplary embodiment, a cutout 2c' is provided on the battery-side external connection terminal 4b of the wiring substrate 2. The battery-side external connection terminal 4b is U-shaped so that the cutout 2c' is surrounded by the battery-side external connection terminal 4b.

In the same manner as the metal plate 10a including the free edge 10a-1 and the slit 10a-2, the metal plate 10b includes a free edge 10b-1 and a slit 10b-2. The free edge 10b-1 of the metal plate 10b is exposed through the cutout 2c' when viewed from the back surface 2b of the wiring substrate 2.

Figure 8A:
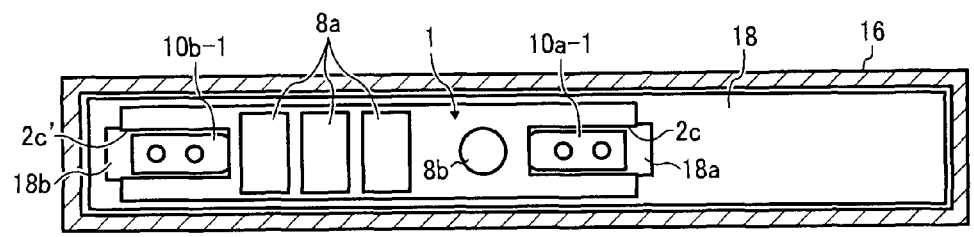
FIGS. 8A and 8B are top and side views, respectively, of an example of a configuration of a battery pack including the protection circuit module illustrated in FIGS. 7A to 7D.
Figure 8B:
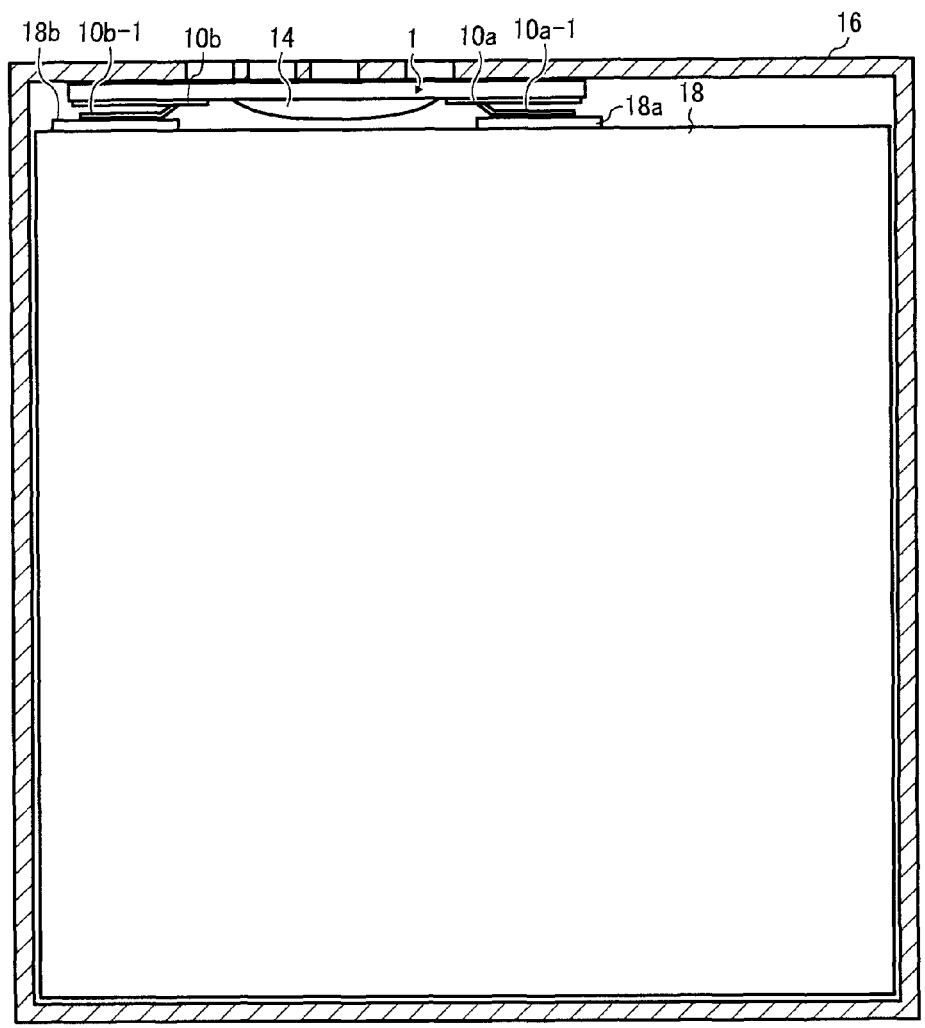

FIGS. 8A and 8B are plan and side views, respectively, of a configuration of a battery pack including the protection circuit module 1 according to the fourth exemplary embodiment. In FIGS. 8A and 8B, the same reference numerals are assigned to those components that are the same as those illustrated in FIGS. 3A and 3B.

The metal plate 10a of the protection circuit module 1 is connected to the electrode 18a of the secondary battery 18 by spot-welding the free edge 10a-1 of the metal plate 10a to the electrode 18a. Specifically, the free edge 10a-1 is spot-welded to the electrode 18a through the cutout 2c of the wiring substrate 2.

The metal plate 10b of the protection circuit module 1 is connected to an electrode 18b of the secondary battery 18 by spot-welding the free edge 10b-1 of the metal plate 10b to the electrode 18b. Specifically, the free edge 10b-1 is spot-welded to the electrode 18b through the cutout 2c' of the wiring substrate 2.

As described above, the protection circuit module 1 according to the fourth exemplary embodiment can be connected to the secondary battery 18 having the electrodes 18a and 18b on the same surface without using a metal lead.

In the protection circuit module 1 according to the fourth exemplary embodiment, the wiring substrate 2 includes the cutouts 2c and 2c' at a part of each of the metal plates 10a and 10b, respectively, and the free edge 10a-1 of the metal plate 10a and the free edge 10b-1 of the metal plate 10b are exposed respectively through the cutouts 2c and 2c' when viewed from the back surface 2b of the wiring substrate 2. Accordingly, the metal plate 10a is directly welded to the electrode 18a of the secondary battery 18, and the metal plate 10b is directly welded to the electrode 18b of the secondary battery 18. Because the above-described configuration makes it possible to eliminate the metal lead for connecting the protection circuit module 1 to the secondary battery 18, a space required to route the metal lead for connecting the external connection terminals 4a and 4b of the protection circuit module 1 to the secondary battery 18 can be eliminated in the housing 16 of the battery pack. When the space for the metal lead is eliminated, the size of the battery pack can be reduced. In addition, the capacitance of the secondary battery can be increased in the battery pack having no space for the metal lead.

Further, in the protection circuit module 1 according to the fourth exemplary embodiment, the metal plates 10a and 10b include the slits 10a-2 and 10b-2, respectively, such that the part of each of the metal plates 10a and 10b exposed through the cutouts 2c and 2c' when viewed from the back surface 2b of the wiring substrate 2 serve as the free edges 10a-1 and 10b-1 movable relative to the wiring substrate 2, respectively. Base edges of each of the free edges 10a-1 and 10b-1 are bent so that there is a space between a leading edge of the free edge 10a-1 and the wiring substrate 2, and a leading edge of the free edge 10b-1 and the wiring substrate 2, respectively, when viewed from the lateral side of the protection circuit module 1. Accordingly, stress between the protection circuit module 1 and the electrodes 18a and 18b of the secondary battery 18 can be absorbed by providing elasticity to the base edges of each of the free edges 10a-1 and 10b-1.

As illustrated in FIGS. 7A to 7D, in the protection circuit module 1 according to the fourth exemplary embodiment, the wiring substrate 2 includes the cutouts 2c and 2c' at a part of each of the metal plates 10a and 10b, respectively. Alternatively, the wiring substrate 2 may include through-holes in place of the cutouts 2c and 2c'.

In the protection circuit module 1 according to the fourth exemplary embodiment, the metal plates 10a and 10b need not necessarily include the free edges 10a-1 and 10b-1 and the slits 10a-2 and 10b-2, respectively. Further, the metal plates 10a and 10b may have a flat plate-like shape in the same manner as the protection circuit module 1 according to the third exemplary embodiment.

As can be appreciated by those skilled in the art, numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

This patent specification is based on Japanese Patent Application No. 2007-257153 filed on Oct. 1, 2007 in the Japan Patent Office, the entire contents of which are hereby incorporated herein by reference.

What is claimed is:

1. A protection circuit module for a secondary battery, comprising:
   a wiring substrate comprising a top surface, a back surface opposite the top surface, and cutout or through-hole in the wiring substrate;
   two battery-side external connection terminals provided on the top surface of the wiring substrate;
   multiple load-side external connection terminals provided on the back surface of the wiring substrate opposite the top surface;
   one or more electronic components provided on the wiring substrate; and
   two metal plates provided on the respective battery-side external connection terminals,
   wherein the cutout or through-hole is provided at a portion of the wiring substrate in which one metal plate of the two metal plates is provided, the one metal plate is provided is on a corresponding battery side external connection terminal of the two battery side external connection terminals, and the corresponding battery side external connection terminal is interposed in a thickness direction of the wiring substrate between the wiring substrate and a portion of the one metal plate, so that a first part of the one metal plate over a top surface side of the wiring substrate is exposed through the cutout or the through-hole when viewed from the back surface of the wiring substrate.

2. The protection circuit module for a secondary battery according to claim 1, comprising two cutouts or through-holes in the wiring substrate, each of which is provided at a portion of the wiring substrate in which each of the two metal plates is provided.

3. The protection circuit module for a secondary battery according to claim 1,
   wherein when the battery-side external connection terminals are on the top surface of the wiring substrate, and the metal plates are on the respective battery side external connection terminals, the first part of the one metal plate is exposed through the cutout or the through-hole when viewed from the back surface of the wiring substrate.

4. The protection circuit module for a secondary battery according to claim 1,
   wherein the first part of the one of the two metal plates that is exposed through the cutout or the through-hole when viewed from the back surface of the wiring substrate is movable relative to the wiring substrate while a second part of the one of the two metal plates remains on the corresponding one of the battery side external connection terminal.

5. The protection circuit module for a secondary battery according to claim 4,
   wherein the corresponding one of the battery side external connection terminal is interposed in a thickness direction of the wiring substrate between the wiring substrate and the second part of the one of the two metal plates.

6. The protection circuit module for a secondary battery according to claim 5,
   wherein the first and second parts of the one of the two metal plates are configured with the first part being bent relative to the second part such that while the corresponding one of the battery side external connection terminal remains interposed in the thickness direction of the wiring substrate between the wiring substrate and the second part, there is an unoccupied space between the first part and the wiring substrate when viewed from a lateral side of the protection circuit module.

7. The protection circuit module for a secondary battery according to claim 1, wherein the battery-side external connection terminals are made of a first material, and the metal plates are made of a second material different from the first material.

8. A protection circuit module for a secondary battery, comprising:
   a wiring substrate comprising:
      two battery-side external connection terminals provided on a top surface thereof;

multiple load-side external connection terminals provided on a back surface opposite the top surface; and at least one cutout or through-hole in the wiring substrate;

one or more electronic components provided on the wiring substrate; and two metal plates provided respectively on the two battery-side external connection terminals, wherein the at least one cutout or through-hole is provided at a portion of the wiring substrate in which one of the two metal plates is provided, so that a part of the one of the two metal plates is exposed through the cutout or the through-hole when viewed from the back surface of the wiring substrate, wherein a slit is formed in the one of the two metal plates so that the part of the one of the two metal plates exposed through the cutout or the through-hole when viewed from the back surface of the wiring substrate serves as a free edge movable relative to the wiring substrate, and a base edge of the free edge is bent to provide a space between a leading edge of the free edge and the wiring substrate when viewed from a lateral side of the wiring substrate.

9. A battery pack comprising:

a housing;

a secondary battery disposed within the housing; and a protection circuit module including:

a wiring substrate comprising a top surface, a back surface opposite the top surface, and cutout or through-hole in the wiring substrate;

two battery-side external connection terminals provided on the top surface of the wiring substrate;

multiple load-side external connection terminals provided on the back surface of the wiring substrate opposite the top surface;

one or more electronic components provided on the wiring substrate; and two metal plates provided on the respective battery-side external connection terminals, wherein the cutout or through-hole is provided at a portion of the wiring substrate in which one metal plate of the two metal plates is provided, the one metal plate is provided is on a corresponding battery side external connection terminal of the two battery side external connection terminals, and the corresponding battery side external connection terminal is interposed in a thickness direction of the wiring substrate between the wiring substrate and a portion of the one metal plate, so that a first part of the one metal plate over a top surface side of the wiring substrate is exposed through the cutout or the through-hole when viewed from the back surface of the wiring substrate, and wherein the protection circuit module is arranged within the housing such that the back surface on which the load-side external connection terminals are provided faces towards the housing and the top surface on which the metal plates are provided faces toward the secondary battery.

10. The battery pack according to claim 9, wherein a slit is formed in the one of the two metal plates so that the part of the one of the two metal plates exposed through the cutout or the through-hole when viewed from the back surface of the wiring substrate serves as a free edge movable relative to the wiring substrate, and a base edge of the free edge is bent to provide a space between a leading edge of the free edge and the wiring substrate when viewed from a lateral side of the wiring substrate.

11. The battery pack according to claim 9, wherein when the battery-side external connection terminals are on the top surface of the wiring substrate, and the metal plates are on the respective battery side external connection terminals, the first part of the one of the two metal plates is exposed through the cutout or the through-hole when viewed from the back surface of the wiring substrate.

12. The battery pack according to claim 9, wherein the first part of the one of the two metal plates that is exposed through the cutout or the through-hole when viewed from the back surface of the wiring substrate is movable relative to the wiring substrate while a second part of the one of the two metal plates remains on the corresponding one of the battery side external connection terminal.

13. The battery pack according to claim 12, wherein the corresponding one of the battery side external connection terminal is interposed in a thickness direction of the wiring substrate between the wiring substrate and the second part of the one of the two metal plates.

14. The battery pack according to claim 13, wherein the first and second parts of the one of the two metal plates are configured with the first part being bent relative to the second part such that while the corresponding one of the battery side external connection terminal remains interposed in the thickness direction of the wiring substrate between the wiring substrate and the second part, there is an unoccupied space between the first part and the wiring substrate when viewed from a lateral side of the protection circuit module.

15. The battery pack according to claim 9, wherein the battery-side external connection terminals are made of a first material, and the metal plates are made of a second material different from the first material.

* * * * *